United States Patent
Park

(10) Patent No.: US 10,855,922 B2
(45) Date of Patent: Dec. 1, 2020

(54) INNER MONITORING SYSTEM OF AUTONOMOUS VEHICLE AND SYSTEM THEREOF

(71) Applicant: LG Electronics Inc., Seoul (KR)

(72) Inventor: Minsick Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/567,877

(22) Filed: Sep. 11, 2019

(65) Prior Publication Data

US 2020/0007767 A1    Jan. 2, 2020

(30) Foreign Application Priority Data

Jul. 8, 2019  (KR) .................... 10-2019-0082032

(51) Int. Cl.
*H04N 7/18*        (2006.01)
*H04N 5/232*       (2006.01)
*G06K 9/00*        (2006.01)
*G06K 9/46*        (2006.01)

(52) U.S. Cl.
CPC ..... *H04N 5/23245* (2013.01); *G06K 9/00832* (2013.01); *G06K 9/4661* (2013.01); *H04N 7/18* (2013.01)

(58) Field of Classification Search
CPC .. H04N 5/23245; H04N 7/18; G06K 9/00832; G06K 9/4661

USPC ........................................................ 348/148
See application file for complete search history.

(56) References Cited

U.S. PATENT DOCUMENTS

| | | | | |
|---|---|---|---|---|
| 2009/0315722 | A1* | 12/2009 | Hou ..................... | G08B 17/125 340/578 |
| 2012/0200734 | A1* | 8/2012 | Tang .................... | H04N 5/3696 348/223.1 |
| 2013/0286236 | A1* | 10/2013 | Mankowski ....... | H04N 5/23222 348/222.1 |
| 2017/0078591 | A1* | 3/2017 | Petrov .................... | H04N 5/332 |
| 2017/0237946 | A1* | 8/2017 | Schofield ............. | B60S 1/0822 348/148 |

\* cited by examiner

*Primary Examiner* — Michael Lee
(74) *Attorney, Agent, or Firm* — Fish & Richardson P.C.

(57) ABSTRACT

A method of monitoring an interior of an autonomous vehicle using an image sensor including a unit pixel composed of an infrared pixel and three primary color-pixels, according to an embodiment of the present invention, includes the following procedure. Setting an RGB mode boundary value that is expressed in illumination and an infrared mode boundary value having illumination lower than the RGB mode boundary value; acquiring an illumination value of the interior of the vehicle; and creating an RGB image and an infrared image from the image sensor in accordance with the illumination value and driving in a common mode that creates both of the RGB image and the infrared image when the illumination value is less than the RGB mode boundary value and is the infrared mode boundary value or more.

12 Claims, 17 Drawing Sheets

USER

INNER MONITORING SYSTEM OF AUTONOMOUS VEHICLE AND SYSTEM THEREOF

CROSS-REFERENCE TO RELATED APPLICATION

This application claims priority under 35 U.S.C. 119 to Korean Application No. 10-2019-0082032, filed on Jul. 8, 2019, the disclosure of which is herein incorporated by reference in its entirety.

BACKGROUND OF THE INVENTION

Field of the Invention

The present invention relates to a method of monitoring the interior of an autonomous vehicle and a system for the same, particularly, a method of monitoring the interior of an autonomous vehicle, the method being able to selectively create an image in accordance with illumination and brightness, and a system for the same.

Related Art

Vehicles, in accordance with the prime mover that is used, can be classified into an internal combustion engine vehicle, an external combustion engine vehicle, a gas turbine vehicle, an electric vehicle or the like.

Recently, studies of an autonomous vehicle that can drive itself with operation by a driver partially or completely excluded have been actively conducted.

Since there is no driver in autonomous vehicles, autonomous vehicles may be driven without a person therein, depending on situations, and accordingly, a situation in which it is required to monitor the interior of autonomous vehicles occurs in order to correspond to the functions of the autonomous vehicles.

SUMMARY OF THE INVENTION

An object of the present invention is to solve the problems described above.

The present invention provides a means that can efficiently monitor the interior of a vehicle.

The present invention provides a means that can create an optimal image that can monitor the interior of a vehicle in accordance with illumination.

A method of monitoring an interior of an autonomous vehicle using an image sensor including a unit pixel composed of an infrared pixel and three primary color-pixels, according to an embodiment of the present invention, includes the following procedure. Setting an RGB mode boundary value that is expressed in illumination and an infrared mode boundary value having illumination lower than the RGB mode boundary value; acquiring an illumination value of the interior of the vehicle; and creating an RGB image and an infrared image from the image sensor in accordance with the illumination value and driving in a common mode that creates both of the RGB image and the infrared image when the illumination value is less than the RGB mode boundary value and is the infrared mode boundary value or more.

According to an embodiment of the present invention, the method may include driving in an RGB mode that creates an RGB image from the image sensor when the illumination value is the RGB mode boundary value or more.

The method may include driving in an infrared mode that creates an IR image from the image sensor when the illumination value is less than the IR mode boundary value.

The setting of an RGB mode boundary value may include setting the RGB mode boundary value such that a detection ratio becomes a predetermined first reference value or more when the detection ratio, which is a ratio of images from which landmarks disposed at a specific position in the vehicle are detected of several RGB images, is acquired at illumination that is the RGB mode boundary value or more.

The setting of an RGB mode boundary value may include setting the RGB mode boundary value such that a detection ratio becomes a predetermined first reference value or more when the detection ratio, which is a ratio of images from which landmarks disposed at a specific position in the vehicle are detected of several IR images, is acquired at illumination that is lower than the infrared mode boundary value.

The setting of an RGB mode boundary value may include: calculating a detection ratio that is a ratio of images from which landmarks disposed at a specific position in the vehicle are detected of several RGB images; acquiring an illumination value of the interior of the vehicle when the detection ratio is less than a predetermined first reference value and is a predetermined second reference value or more in a range lower than the first reference value; and setting the illumination value as the RGB mode boundary value.

The method may include: acquiring an illumination value of the interior of the vehicle when the detection ratio is less than the second reference value; and setting the illumination value as the infrared mode boundary value.

The setting of an RGB mode boundary value may further include: acquiring a first RGB mode boundary value in a first period; acquiring the detection ratio of the RGB images on the basis of the first RGB mode boundary value; acquiring a second RGB mode boundary value in a second period not overlapping the first period; acquiring the detection ratio of the RGB images on the basis of the second RGB mode boundary value; and setting one from which the detection ratio of the RGB images is acquired higher of the first RGB mode boundary value and the second RGB mode boundary value as the RGB mode boundary value.

The driving in a common mode may include: calculating a detection ratio of RGB images that is a ratio of images from which landmarks disposed at a specific position of the interior of the vehicle are detected of several RGB images for a predetermined time; acquiring a detection ratio of IR images that is a ratio of images from which landmarks disposed at a specific position of the interior of the vehicle are detected of several IR images for a predetermined time; and performing monitoring on images having a larger value of the detection ratio of RGB images or the detection ratio of IR images.

The setting of an infrared mode boundary value may include: calculating an average gradation value of pixels in an RGB area in the RGB mode; driving the infrared mode when the average gradation value is predetermined reference brightness or less; and setting the infrared mode boundary value on the basis of the detection ratio of the IR images in driving of the infrared mode.

The method may further include: acquiring the detection ratio of the IR images at illumination lower than the infrared mode boundary value in driving of the infrared mode; and creating an error event when the detection ratio of the IR images is less than the first reference value.

The creating of an infrared image may further include radiating infrared light to the interior of the vehicle using an infrared radiation unit.

A system for monitoring an interior of a vehicle according to the present invention includes: an image sensor disposed in the vehicle and including a unit pixel composed of an infrared pixel and three primary color-pixels; an illumination sensor acquiring illumination of the interior of the vehicle; and a monitoring control unit creating an RGB image and an infrared image from the image sensor in accordance with the illumination value, in which the monitoring control unit creates both of the RGB image and the infrared image when the illumination value is less than a predetermined RGB mode boundary value and is a predetermined infrared mode boundary value.

The monitoring control unit may acquire an RGB mode boundary value in the unit of a predetermined period and may update an RGB mode boundary value having a high detection ratio of landmarks disposed at a specific position.

According to the present invention, it is possible to efficiently monitor the interior of an autonomous vehicle by acquiring an image of the interior of the vehicle without a person.

In particular, since the present invention creates an RGB image or an IR image, depending on illumination, it is possible to more accurately perform monitoring.

EMBODIMENT FOR INVENTION

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Block Diagram of UE and 5G Network

Figure 1:
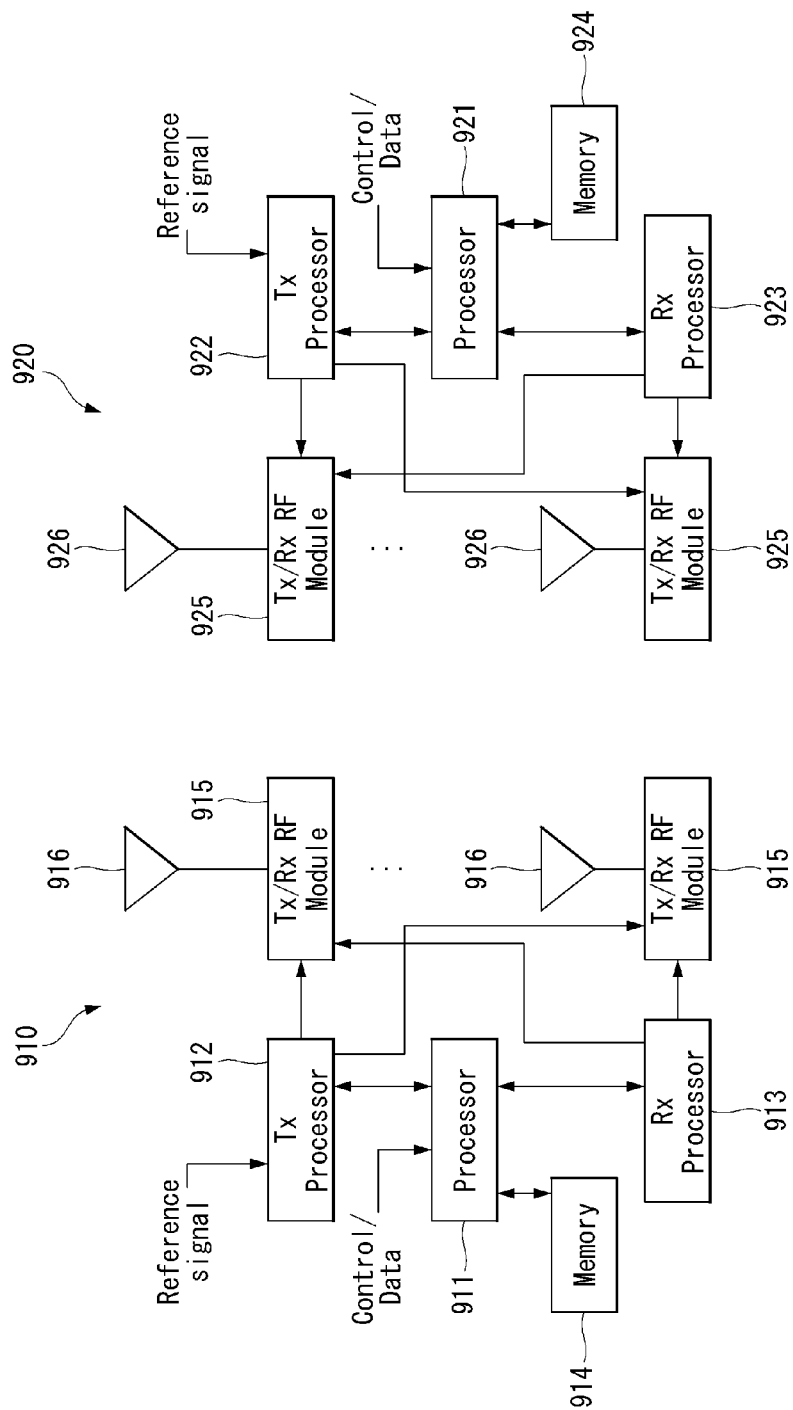
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a vehicle, a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
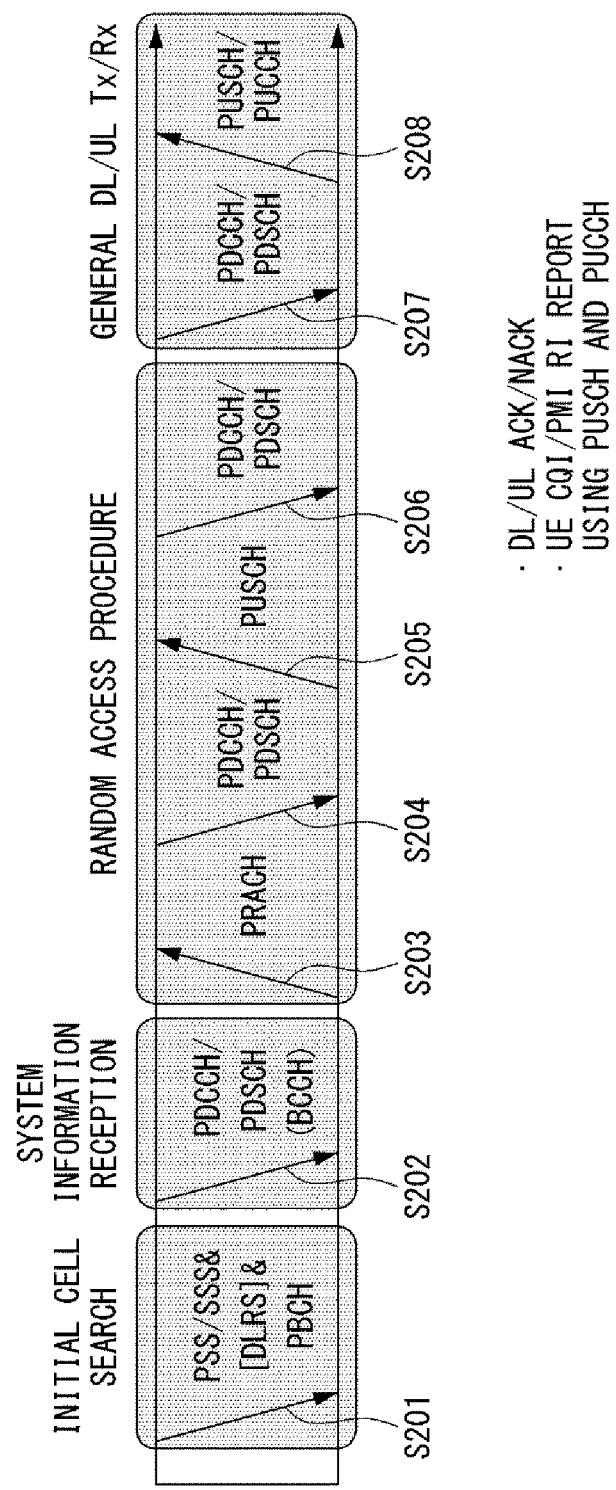
FIG. 2 is a diagram showing an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

Figure 3:
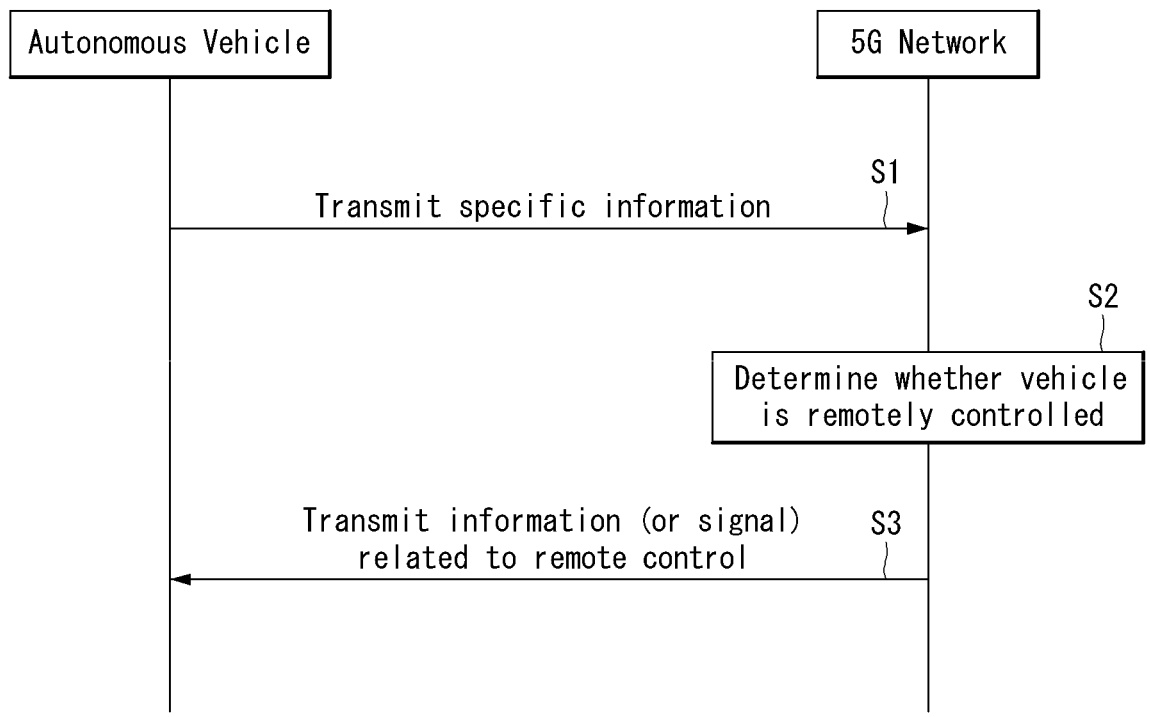
FIG. 3 shows an example of basic operations of a user equipment and a 5G network in a 5G communication system.

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

Figure 4:
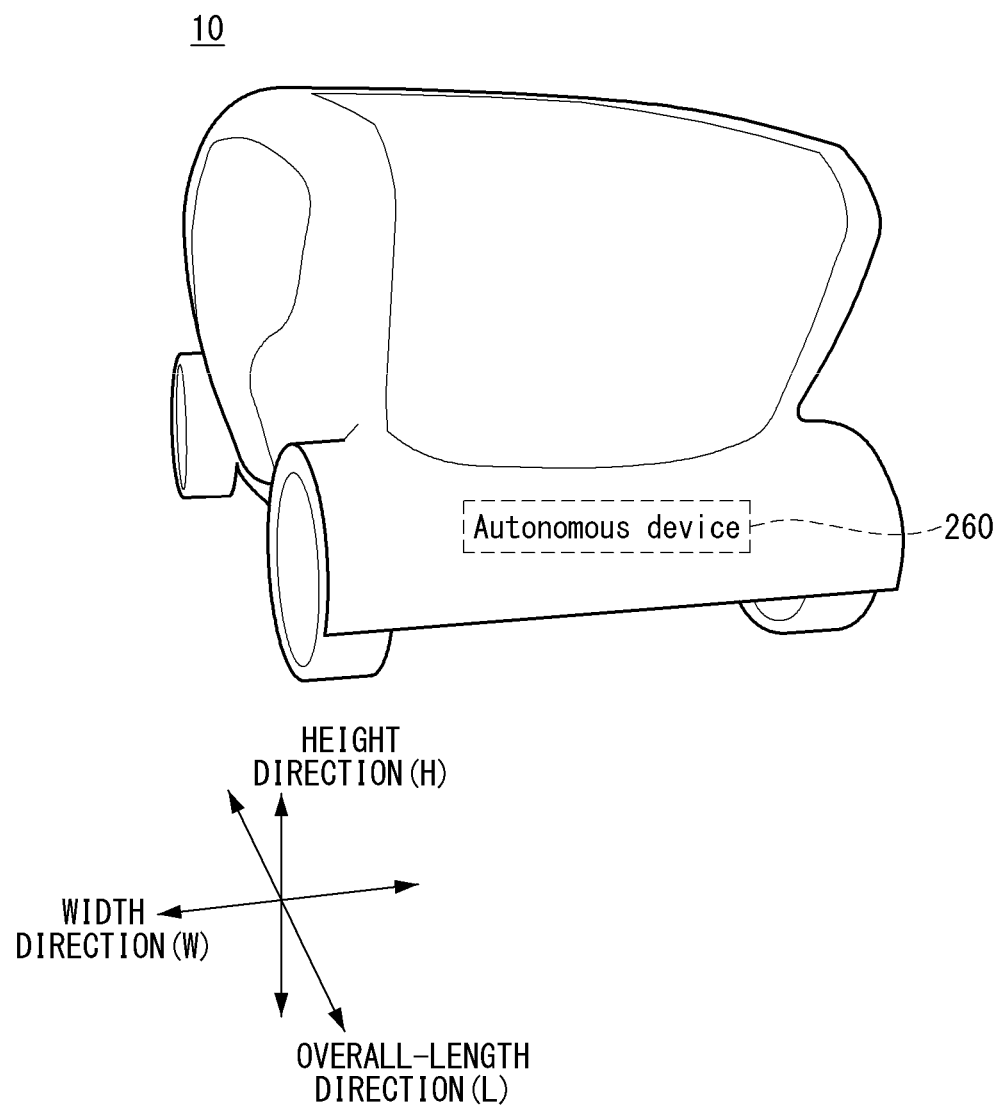
FIG. 4 is a diagram showing a vehicle according to an embodiment of the present invention.

FIG. 4 is a diagram showing a vehicle according to an embodiment of the present invention.

Referring to FIG. 4, a vehicle 10 according to an embodiment of the present invention is defined as a transportation means traveling on roads or railroads. The vehicle 10 includes a car, a train and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

Figure 5:
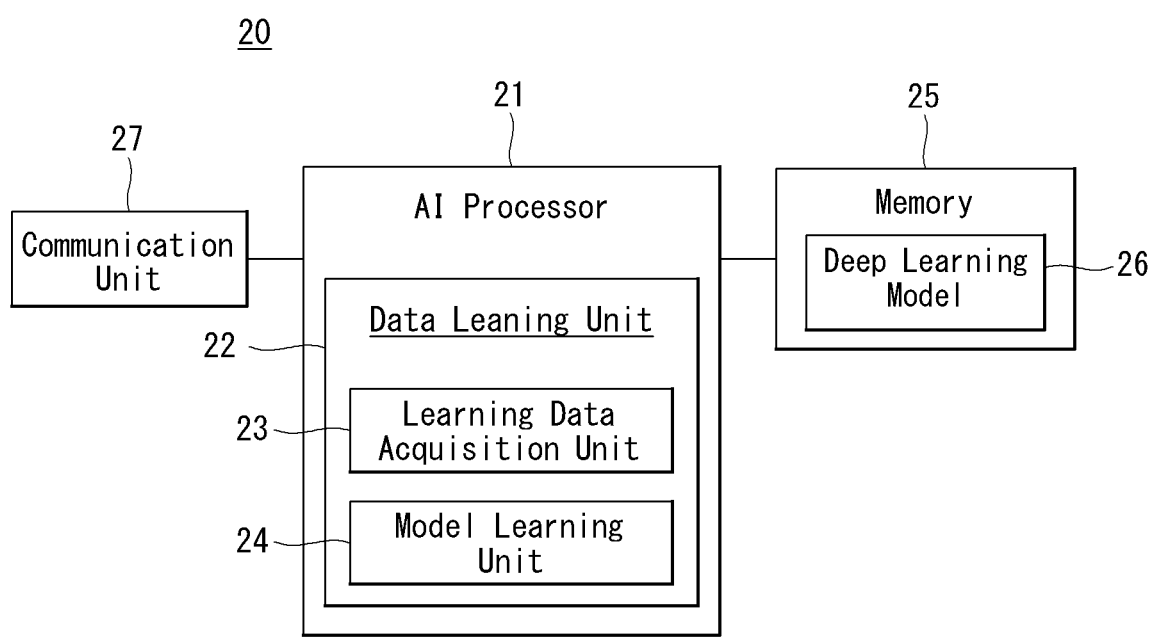
FIG. 5 is a block diagram of an AI device according to an embodiment of the present invention.

FIG. 5 is a block diagram of an AI device according to an embodiment of the present invention.

An AI device 20 may include an electronic device including an AI module that can perform AI processing, a server including the AI module, or the like. Further, the AI device 20 may be included as at least one component of the vehicle 10 shown in FIG. 1 to perform together at least a portion of the AI processing.

The AI processing may include all operations related to driving of the vehicle 10 shown in FIG. 5. For example, an autonomous vehicle can perform operations of processing/determining, and control signal generating by performing AI processing on sensing data or driver data. Further, for example, an autonomous vehicle can perform autonomous driving control by performing AI processing on data acquired through interaction with other electronic devices included in the vehicle.

The AI device 20 may include an AI processor 21, a memory 25, and/or a communication unit 27.

The AI device 20, which is a computing device that can learn a neural network, may be implemented as various electronic devices such as a server, a desktop PC, a notebook PC, and a tablet PC.

The AI processor 21 can learn a neural network using programs stored in the memory 25. In particular, the AI processor 21 can learn a neural network for recognizing data related to vehicles. Here, the neural network for recognizing data related to vehicles may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present invention.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

Figure 6:
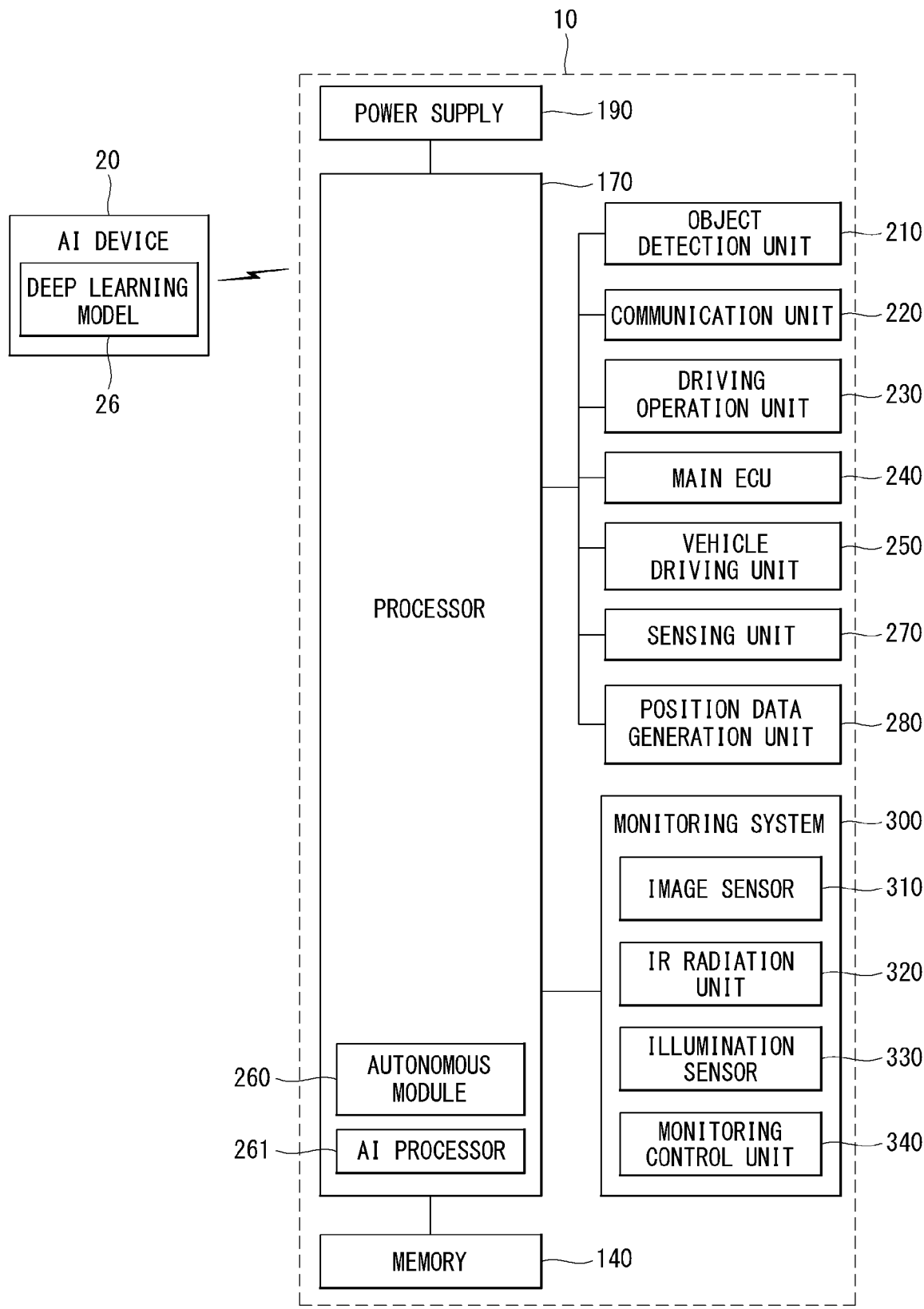
FIG. 6 is a diagram for illustrating a system in which an autonomous vehicle and an AI device according to an embodiment of the present invention are linked.

FIG. 6 is a diagram for illustrating a system in which an autonomous vehicle and an AI device according to an embodiment of the present invention are linked.

Referring to FIG. 6, an autonomous vehicle 10 can transmit data that requires AI processing to an AI device 20 through a communication unit and the AI device including a deep learning model 26 can transmit an AI processing result using the deep learning model 26 to the autonomous vehicle 10. The description of FIG. 2 can be referred to for the AI device 20.

The autonomous vehicle 10 may include a memory 140, a processor 170, and a power supply 170 and the processor 170 may further include an autonomous module 260 and an AI processor 261. Further, the autonomous vehicle 10 may include an interface that is connected with at least one electronic device included in the vehicle in a wired or wireless manner and can exchange data for autonomous driving control. At least one electronic device connected through the interface may include an object detection unit 210, a communication unit 220, a driving operation unit 230, a main ECU 240, a vehicle driving unit 250, a sensing unit 270, and a position data generation unit 280.

The interface can be configured using at least one of a communication module, a terminal, a pin, a cable, a port, a circuit, an element, and a device.

The memory 140 is electrically connected with the processor 170. The memory 140 can store basic data about units, control data for operation control of units, and input/output data. The memory 140 can store data processed in the processor 170. Hardware-wise, the memory 140 may be configured using at least one of a ROM, a RAM, an EPROM, a flash drive and a hard drive. The memory 140 can store various types of data for the overall operation of the autonomous vehicle 10, such as a program for processing or control of the processor 170. The memory 140 may be integrated with the processor 170. Depending on embodiments, the memory 140 may be classified as a lower configuration of the processor 170.

The power supply 190 can supply power to the autonomous vehicle 10. The power supply 190 can be provided with power from a power source (e.g., a battery) included in the autonomous vehicle 10 and can supply the power to each unit of the autonomous vehicle 10. The power supply 190 can operate according to a control signal supplied from the main ECU 240. The power supply 190 may include a switched-mode power supply (SMPS).

The processor 170 can be electrically connected to the memory 140, the interface 180, and the power supply 190 and exchange signals with these components. The processor 170 can be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 can be operated by power supplied from the power supply 190. The processor 170 can receive data, process the data, generate a signal, and provide the signal while power is supplied thereto by the power supply 190.

The processor 170 can receive information from other electronic devices included in the autonomous vehicle 10 through the interface. The processor 170 can provide control signals to other electronic devices in the autonomous vehicle 10 through the interface.

The autonomous device 10 may include at least one printed circuit board (PCB). The memory 140, the interface, the power supply 190, and the processor 170 may be electrically connected to the PCB.

Hereafter, other electronic devices connected with the interface and included in the vehicle, the AI processor 261, and the autonomous module 260 will be described in more detail. Hereafter, for the convenience of description, the autonomous vehicle 10 is referred to as a vehicle 10.

First, the object detection unit 210 can generate information on objects outside the vehicle 10. The AI processor 261 can generate at least one of on presence or absence of an object, positional information of the object, information on a distance between the vehicle and the object, and information on a relative speed of the vehicle with respect to the object by applying data acquired through the object detection unit 210 to a neural network model.

The object detection unit 210 may include at least one sensor that can detect objects outside the vehicle 10. The sensor may include at least one of a camera, a radar, a lidar, an ultrasonic sensor, and an infrared sensor. The object detection unit 210 can provide data about an object generated on the basis of a sensing signal generated from a sensor to at least one electronic device included in the vehicle.

Meanwhile, the vehicle 10 transmits the sensing data acquired through at least one sensor to the AI device 20 through the communication unit 220 and the AI device 20 can transmit AI processing data by applying the neural network model 26 to the transmitted data to the vehicle 10. The vehicle 10 recognizes information about the detected object on the basis of the received AI processing data and the autonomous module 260 can perform an autonomous driving control operation using the recognized information.

The communication unit 220 can exchange signals with devices disposed outside the vehicle 10. The communication unit 220 can exchange signals with at least one of an infrastructure (e.g., a server and a broadcast station), another vehicle, and a terminal. The communication unit 220 may include at least any one of a transmission antenna, a reception antenna, a radio frequency (RF) circuit which can implement various communication protocols, and an RF element in order to perform communication.

It is possible to generate at least one of on presence or absence of an object, positional information of the object, information on a distance between the vehicle and the object, and information on a relative speed of the vehicle with respect to the object by applying data acquired through the object detection unit 210 to a neural network model.

The driving operation unit 230 is a device for receiving user input for driving. In a manual mode, the vehicle 10 may be driven on the basis of a signal provided by the driving operation unit 230. The driving operation unit 230 may include a steering input device (e.g., a steering wheel), an acceleration input device (e.g., an accelerator pedal), and a brake input device (e.g., a brake pedal).

Meanwhile, the AI processor 261, in an autonomous mode, can generate an input signal of the driving operation unit 230 in accordance with a signal for controlling movement of the vehicle according to a driving plan generated through the autonomous module 260.

Meanwhile, the vehicle 10 transmits the sensing data required for controlling the driving operation unit 230 to the AI device 20 through the communication unit 220 and the AI device 20 can transmit AI processing data by applying the neural network model 26 to the transmitted data to the vehicle 10. The vehicle 10 can use the input signal of the driving operation unit 230 to control movement of the vehicle on the basis of the received AI processing data.

The main ECU 240 can control the overall operation of at least one electronic device included in the vehicle 10.

The vehicle driving unit 250 is a device for electrically controlling various vehicle driving devices included in the vehicle 10. The vehicle driving unit 250 may include a powertrain driving control device, a chassis driving control device, a door/window driving control device, a safety device driving control device, a lamp driving control device, and an air-conditioner driving control device. The powertrain driving control device may include a power source driving control device and a transmission driving control device. The chassis driving control device may include a steering driving control device, a brake driving control device, and a suspension driving control device. Meanwhile, the safety device driving control device may include a seatbelt driving control device for seatbelt control.

The vehicle driving unit 250 includes at least one electronic control device (e.g., a control ECU (Electronic Control Unit)).

The vehicle driving unit 250 can control a power train, a steering device, and a brake device on the basis of signals received by the autonomous module 260. The signals received by the autonomous module 260 may be driving control signals that are generated by applying a neural network model to data related to the vehicle in the AI processor 261. The driving control signals may be signals received from the external AI device 20 through the communication unit 220.

The sensing unit 270 can sense a state of the vehicle. The sensing unit 270 may include at least any one of an internal measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. Further, the IMU sensor may include one or more of an acceleration sensor, a gyro sensor, and a magnetic sensor.

The AI processor 261 can generate state data of the vehicle by applying a neural network model to sensing data generated by at least one sensor. The AI processing data generated by applying the neural network model may include vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an accelerator pedal, data of a pressure applied to a brake pedal, etc.

The autonomous module 260 can generate a driving control signal on the basis of the AI-processed state data of the vehicle.

Meanwhile, the vehicle 10 transmits the sensing data acquired through at least one sensor to the AI device 20 through the communication unit 22 and the AI device 20 can transmit AI processing data generated by applying the neural network model 26 to the transmitted data to the vehicle 10.

The position data generation unit 280 can generate position data of the vehicle 10. The position data generation unit 280 may include at least any one of a global positioning system (GPS) and a differential global positioning system (DGPS).

The AI processor 261 can generate more accurate position data of the vehicle by applying a neural network model to position data generated by at least one position data generation device.

In accordance with an embodiment, the AI processor 261 can perform deep learning calculation on the basis of at least any one of the internal measurement unit (IMU) of the sensing unit 270 and the camera image of the object detection unit 210 and can correct position data on the basis of the generated AI processing data.

Meanwhile, the vehicle 10 transmits the position data acquired from the position data generation unit 280 to the AI device 20 through the communication unit 220 and the AI device 20 can transmit the AI processing data generated by applying the neural network model 26 to the received position data to the vehicle 10.

The vehicle 10 may include an internal communication system 50. The plurality of electronic devices included in the vehicle 10 can exchange signals through the internal communication system 50. The signals may include data. The internal communication system 50 can use at least one communication protocol (e.g., CAN, LIN, FlexRay, MOST or Ethernet).

The autonomous module 260 can generate a route for autonomous driving and a driving plan for driving along the generated route on the basis of the acquired data.

The autonomous module 260 can implement at least one ADAS (Advanced Driver Assistance System) function. The ADAS can implement at least one of ACC (Adaptive Cruise Control), AEB (Autonomous Emergency Braking), FCW (Forward Collision Warning), LKA (Lane Keeping Assist), LCA (Lane Change Assist), TFA (Target Following Assist), BSD (Blind Spot Detection), HBA (High Beam Assist), APS (Auto Parking System), a PD collision warning system, TSR (Traffic Sign Recognition), TSA (Traffic Sign Assist), NV (Night Vision), DSM (Driver Status Monitoring), and TJA (Traffic Jam Assist).

The AI processor 261 can transmit control signals that can perform at least one of the ADAS functions described above to the autonomous module 260 by applying traffic-related information received from at least one sensor included in the vehicle and external devices and information received from another vehicle communicating with the vehicle to a neural network model.

Meanwhile, the vehicle 10 transmits at least one datum for performing the ADAS functions to the AI device 20 through the communication unit 220 and the AI device 20 can transmit a control signal that can perform the ADAS functions to the vehicle 10 by applying the neural network model 260 to the transmitted data.

The autonomous module 260 can acquire state information of a driver and/or state information of the vehicle and can perform an operation of changing from the autonomous driving mode to the manual driving mode or an operation of changing from the manual driving mode to the autonomous driving mode.

A monitoring system 300 creates an RGB image and an IR image of the interior of the vehicle 10 and monitors users or events that occur in the vehicle on the basis of the RGB image and the IR image. To this end, the monitoring system 300 includes an image sensor 310, an IR radiation unit 320, an illumination sensor 330, and a monitoring control unit 340.

Figure 7:
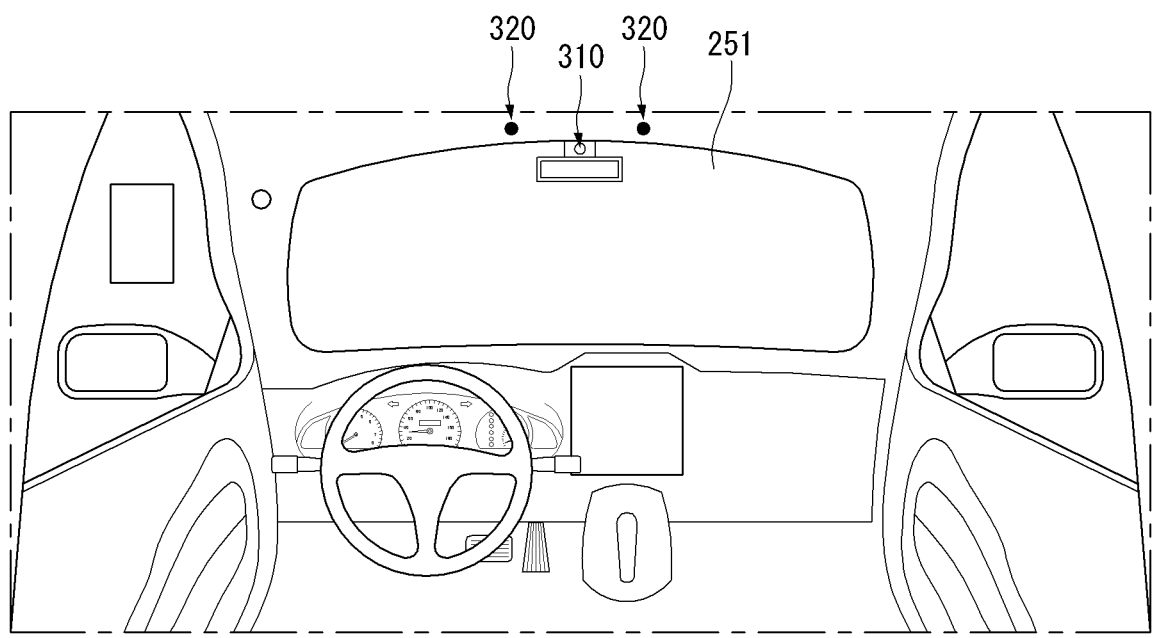
FIGS. 7 and 8 are diagrams showing the main configuration of a monitoring system.
Figure 7:
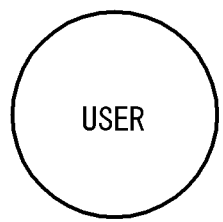
Figure 8:
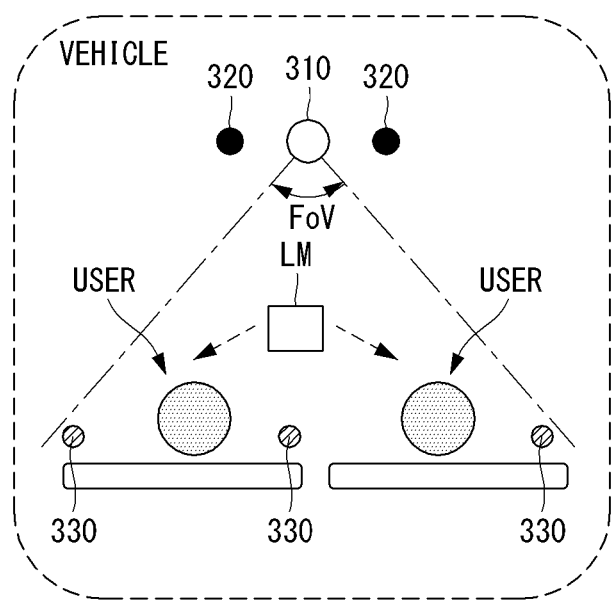
Figure 9:
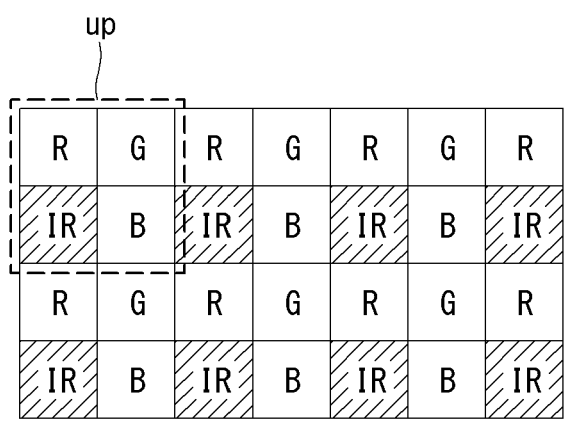
FIG. 9 is a diagram showing a pixel structure of an image sensor.
Figure 10:
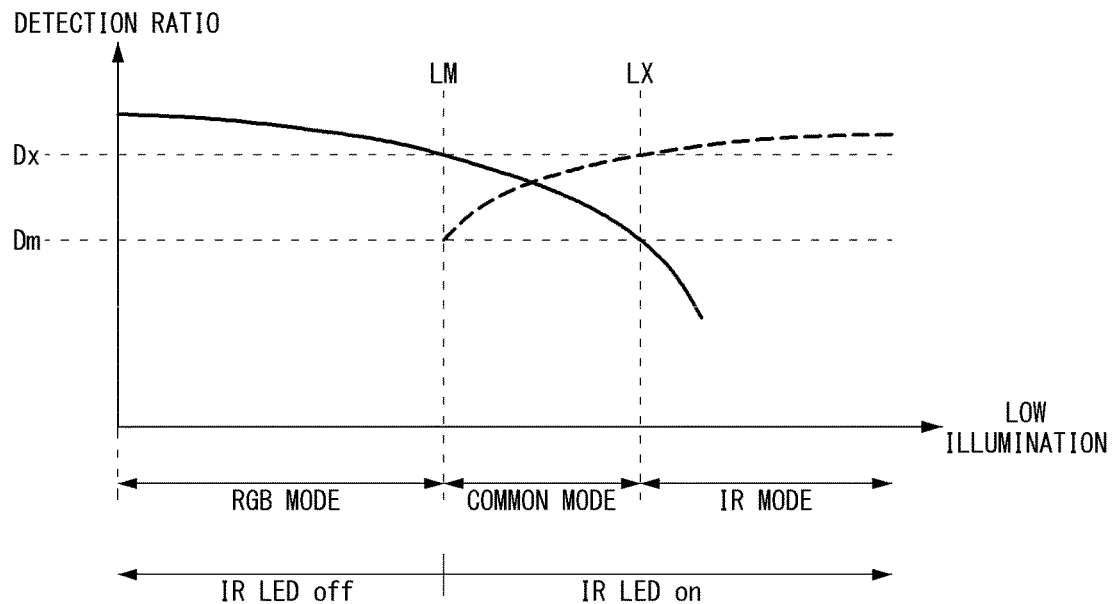
FIG. 10 is a diagram showing a boundary value for mode selection.

FIGS. 7 and 8 are diagrams showing arrangement of the main configuration of a monitoring system. FIG. 9 is a diagram showing a pixel structure of an image sensor. FIG. 10 is a diagram showing a boundary value for mode selection.

Referring to FIGS. 7 to 9, the image sensor 310 is disposed around a room mirror of the vehicle 10 and acquires an image of the interior of the vehicle including users. The image sensor 310, as shown in FIG. 9, includes several unit pixels UP. Each of the unit pixels UP includes an RGB pixel composed of a red pixel R, a green pixel G, and a blue pixel B, and an IR pixel. The RGP pixels receive light of the visible light band and cause current and voltage changes in accordance with the received visible light. The IR pixels receive light of the infrared band and cause current and voltage changes in accordance with the received infrared light.

The IR radiation unit 320 supplements the amount of infrared light reflected by a target in a process of creating an IR image by emitting infrared light.

The illumination sensor 330 is disposed within a field of view (FoV) of the image sensor 310 and acquires a sensing value that is proportioned to illumination.

The monitoring control unit 340 controls the general components of the monitoring system 300.

The monitoring control unit 340 can acquire raw image data in accordance with the amount of light received by the image sensor 310 and can acquire an RGB image or an IR image on the basis of the raw image data.

The monitoring control unit 340 creates illumination information on the basis of the sensing value acquired by the illumination sensor 330. The monitoring control unit 340 selects the monitoring system 300 to be driven in an RGB mode or an IR mode using the illumination information. The monitoring control unit 340 creates an RGB image in the RGB mode and an IR image in the IR mode.

The monitoring control unit 340 can compare the illumination information with predetermined minimum boundary value or maximum boundary value to select a mode. As shown in FIG. 10, the minimum boundary value LM, which is a minimum illumination value for driving in the RGB mode, is an illumination value showing the boundary between the RGB mode and a common mode. The maximum boundary value, which is a maximum illumination value for driving in the IR mode, is an illumination value showing the boundary between the common mode and the IR mode.

In driving of the RGB mode, the minimum boundary value LM is set as minimum illumination at which accuracy of an RGB image can be secured. The accuracy of an RGB image can be set on the basis of the detection ratio of landmarks LM in RGB images. For example, the minimum boundary value may be set in a condition that the detection ratio of landmarks LM in RGB images is a first reference value Dx or more. The landmarks LM are disposed within the field of view (FoV) and are references for determining image acquisition accuracy. As the landmarks LM, objects fixed at specific positions or marks fixed at specific positions in the autonomous vehicle 10 may be used.

In driving of the IR mode, the maximum boundary value LX is set as minimum illumination at which accuracy of an IR image can be secured. The accuracy of an IR image can be set on the basis of the detection ratio of landmarks in IR images. For example, the maximum boundary value may be set in a condition that the detection ratio of landmarks LM in IR images is a first reference value Dx or more. The detection ratio means a ratio of landmarks LM recognized from images acquired through an image sensor.

The first reference value Dx is a reference that makes the accuracy of an image reliable, and for example, set as around 95%.

A second reference value DM is a reference that requires mode change due to deterioration of reliability of the accuracy of an image, and for example, may be set as around 80%.

The monitoring control unit 340 may update the magnitude of the minimum boundary value LM and the maximum boundary value LX in real time in the process of driving the vehicle.

On the other hand, the vehicle 10 can use AI processing data for user support in driving control. For example, as described above, it is possible to check the states of a driver and users through at least one sensor disposed in a vehicle.

Alternately, the vehicle 10 can recognize a voice signal of a driver or a user, perform a voice processing operation, and perform a voice synthesis operation through the AI processor 261.

In the above, 5G communication for implementing a vehicle control method according to an embodiment of the present invention and a rough configuration for performing AI processing and for transmitting the AI processing result by applying the 5G communication were described.

Method of Monitoring Interior of Autonomous Vehicle

Figure 11:
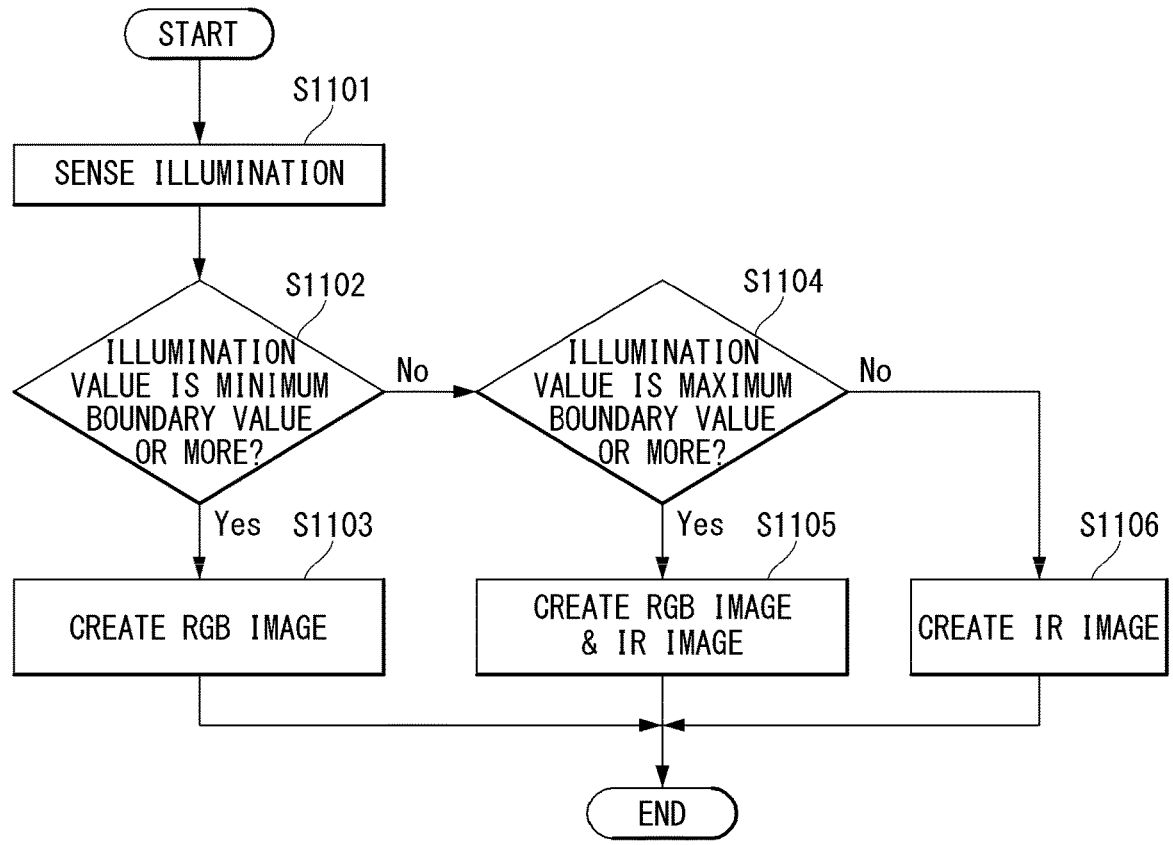
FIG. 11 is a flowchart showing a method of monitoring an interior of an autonomous vehicle according to an embodiment of the present invention.

FIG. 11 is a flowchart showing a method of monitoring an interior of an autonomous vehicle according to an embodiment of the present invention.

Referring to FIG. 11, a method of monitoring an interior of an autonomous vehicle according to an embodiment of the present invention senses illumination in first step (S1101).

The monitoring control unit 340 acquires an illumination value on the basis of the sensing values of the illumination sensors 330.

In second step (S1102), the monitoring control unit 340 compares the illumination value with the minimum boundary value LM.

In third step (S1103), when the illumination value is the minimum boundary value LM or more, the monitoring control unit 340 creates an RGB image. That is, when the illumination value corresponds to an RGB mode period, the monitoring control unit 340 creates an RGB image on the basis of raw image data extracted from the image sensor 310.

In fourth step (S1104), the monitoring control unit 340 compares the illumination value with the maximum boundary value LX.

In fifth step (S1105), when the illumination value is the maximum boundary value LX or more, the monitoring control unit 340 creates both an RGB image and IR image. Fifth step (S1105) includes a condition that the illumination value is less than the minimum boundary value LM in second step (S1102), so it means that the illumination value is the maximum boundary value LX or more and less than the minimum boundary value LM.

That is, when the illumination value corresponds to a common mode period, the monitoring control unit 340 creates both an RGB image and an IR image on the basis of the raw image data extracted from the image sensor 310.

In sixth step, when the illumination value is less than the maximum boundary value LX, the monitoring control unit 340 creates an IR image on the basis of the raw image data extracted fro the image sensor 310.

Figure 12:
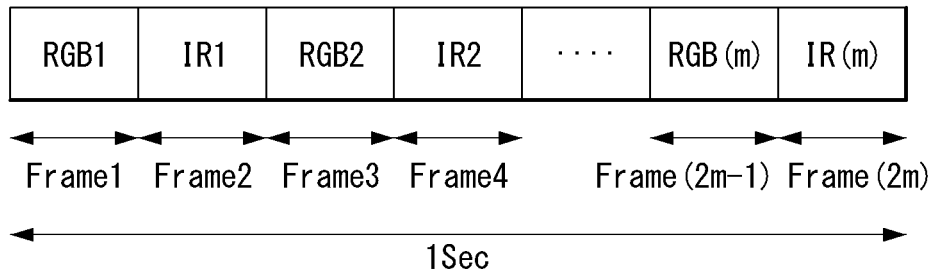
FIG. 12 is a diagram illustrating a method in which a monitoring control unit simultaneously creates an RGB image and an IR image.

FIG. 12 is a diagram illustrating a method in which a monitoring control unit simultaneously creates an RGB image and an IR image. That is, FIG. 12 is a diagram illustrating the embodiment of fifth step (S1105) shown in FIG. 11. FIG. 12 shows an embodiment in which a frame rate of an image that is created by the monitoring control unit is (2 m) Hz.

Referring to FIG. 12, the monitoring control unit 340 creates an RGB image in odd number-th frames and creates an IF image in even number-th frames. For example, a first RGB image RGB1 is created in the first frame and a first IF image IR1 is created in the second frame. Accordingly, the RGB images created for one seconds by the monitoring control unit 340 are m pieces and the IR images created for one seconds are m pieces.

Figure 13:
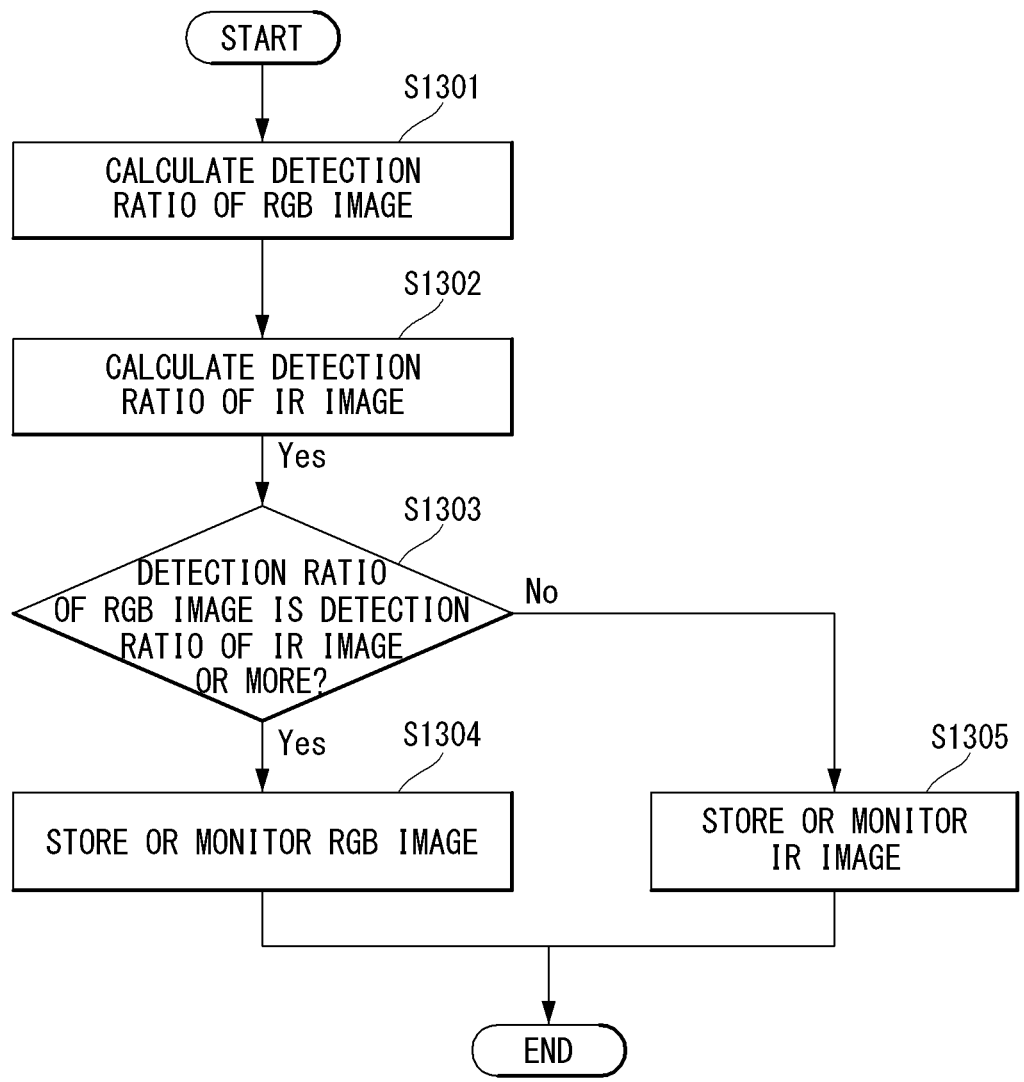
FIG. 13 is a diagram showing an embodiment of a monitoring method in a common mode.

FIG. 13 is a diagram showing an embodiment of a monitoring method in a common mode.

Fifth step (S1105) shown in FIG. 11 illustrates a process of creating both an RGB image and an IR image on the basis of the common mode. The monitoring control unit 340 can select any one of an RGB image and an IR image and can perform monitoring on the interior of the vehicle on the basis of the selected image. A detailed method is described hereafter with reference to FIG. 13.

Referring to FIG. 13, in order to perform monitoring in the common mode, in first step (S1301), the monitoring control unit 340 can calculate a detection ratio of landmarks LM in an RGB image.

In second step (S1302), the monitoring control unit 340 can calculate a detection ratio of landmarks LM in an IR image.

In third step (S1303), the monitoring control unit 340 compares the detection ratio of the RGB image and the detection ratio the IR images.

In fourth step (S1304), when the detection ratio of the RGB image is higher, the monitoring control unit 340 performs a monitoring operation on the basis of the RGB image.

In fifth step (S1305), when the detection ratio of the IR images is higher, the monitoring control unit 340 performs a monitoring operation on the basis of the IR image.

Method of Setting Boundary Value

Figure 14:
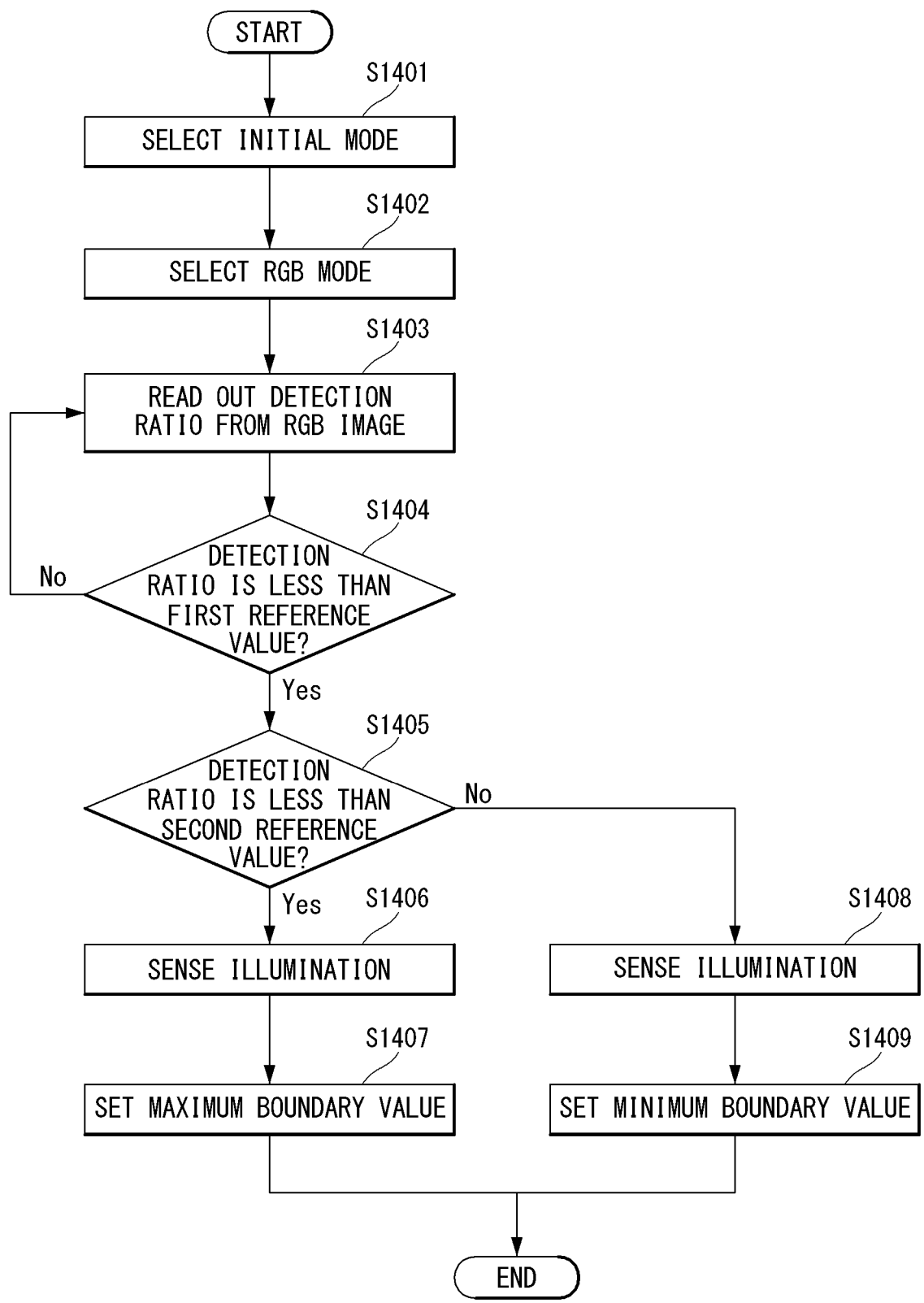
FIG. 14 is a flowchart showing a method of setting a minimum boundary value and a maximum boundary value.

FIG. 14 is a flowchart showing a method of setting a minimum boundary value and a maximum boundary value.

FIG. 11 illustrates a method of selecting a mode and correspondingly creating an image with the minimum boundary value and the maximum boundary value set. The minimum boundary value and the maximum boundary value may be set in advance or may be set as follows in consideration of the actual driving environment while a vehicle is driven.

In order to set a boundary value, in first step (S1401) and second step (S1402), the monitoring control unit 340 selects an initial mode of the RGB mode or the IR mode. The monitoring control unit 340 can select an initial mode on the basis of time information. For example, the monitoring control unit 340 drives the monitoring system 300 in the RGB mode until sunset time after sunrise time.

In order to calculate the minimum boundary value LM, it is preferable to calculate the detection ratio of RGB images on the basis of the RGB mode. Accordingly, the initial mode for setting a boundary value may be based on a condition that, as in second step (S1402), an initial mode was selected as the RGB mode.

In third step (S1303), the monitoring control unit 340 reads out the detection ratio the RGB images. The monitoring control unit 340 creates several RGB images within a predetermined time and calculates the detection ratio of landmarks LM in the RGB images. For example, when creating n RGB images within a predetermined time, the monitoring control unit 340 finds out the number of images from which landmarks LM were detected of the n RGB images. Further, when the number of images from which landmarks LM were detected is 'k', the monitoring control unit 340 can calculate the detection ratio through calculation of "(k/n)×100"(%).

In fourth step (S1404), the monitoring control unit 340 compares the detection ratio the RGB images with a first reference value Dx. If the detection ratio the RGB images is the first reference value or more, the monitoring control unit 340 reads out the detection ratio the RGB images while maintaining the RGB mode.

In fifth step (S1405), when the detection ratio the RGB images is less than the first reference value Dx, the monitoring control unit 340 compares the detection ratio the RGB images with a second reference value Dm.

In sixth step (S1406) and seventh step (S1407), when the detection ratio the RGB images is less than the second reference value Dm, the monitoring control unit 340 is provided with a sensing value from the illumination sensor 330 and sets the sensed illumination value as the maximum boundary value LX. If it is an initial state without a maximum boundary value set, the maximum boundary value LX may be a primary maximum boundary value LX and can be updated by a method to be described below.

In eighth step (S1408) and ninth step (S1409), when the detection ratio the RGB images is the second reference value Dm or more, the monitoring control unit 340 is provided with a sensing value from the illumination sensor 330 and sets the sensed illumination value as the minimum boundary value LM. If it is an initial state without a minimum boundary value set, the minimum boundary value LM may be a primary minimum boundary value LM and can be updated by a method to be described below.

A method of setting a minimum boundary value and a maximum boundary value was described on the basis of FIG. 14. Since the embodiment of FIG. 14 sets a minimum boundary value and a maximum boundary value on the basis of a detection ratio within a predetermined time unit, it is impossible to set ideal minimum boundary value and maximum boundary value. That is, in the embodiment of FIG. 14, a minimum boundary value is set in the common mode period and a maximum boundary value is just set only in the IR mode period. A method for setting more accurate boundary values is described hereafter.

Figure 15:
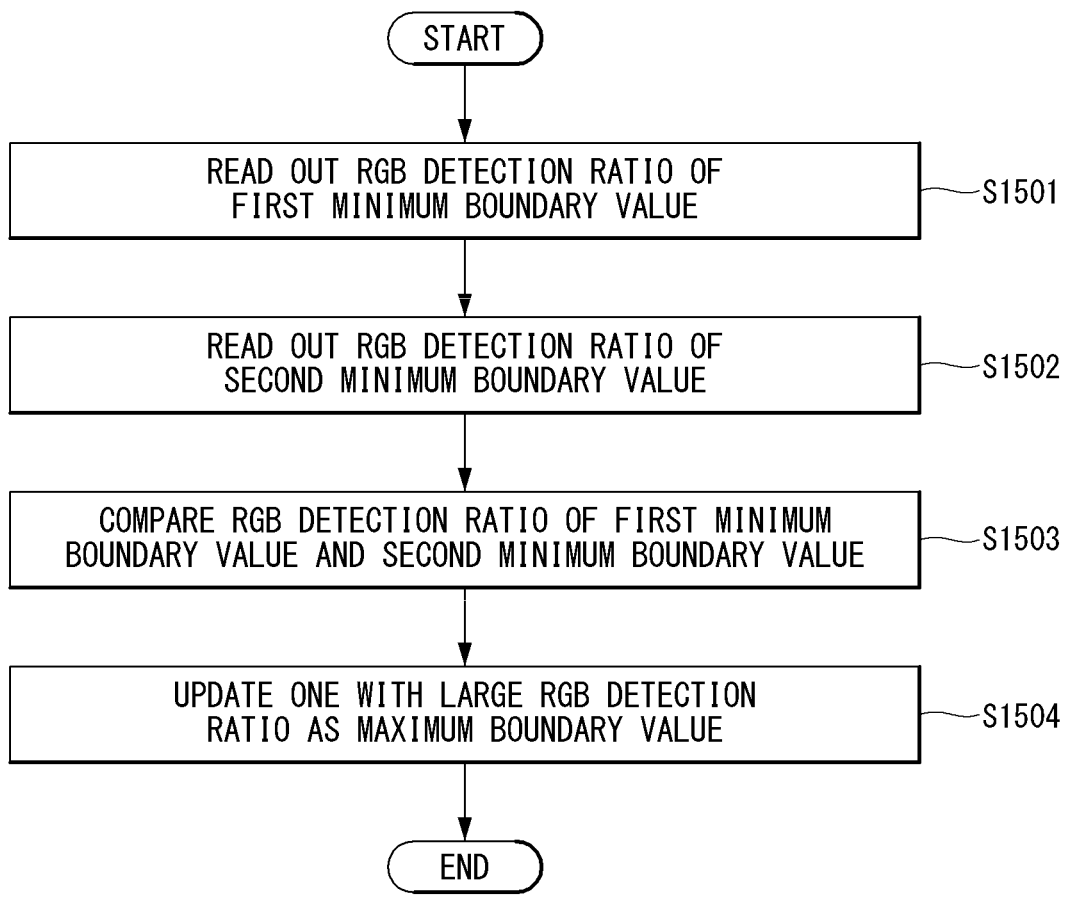
FIG. 15 is a flowchart showing a method of updating a minimum boundary value.
Figure 16:
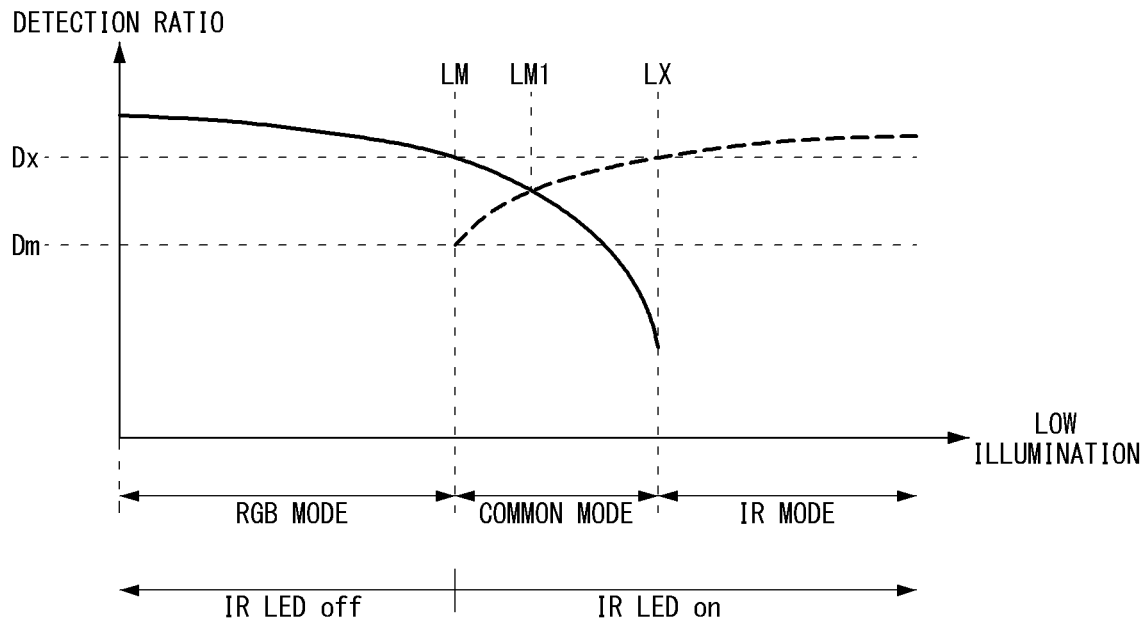
FIGS. 16 and 17 are diagrams illustrating an embodiment of updating a minimum boundary value.
Figure 17:
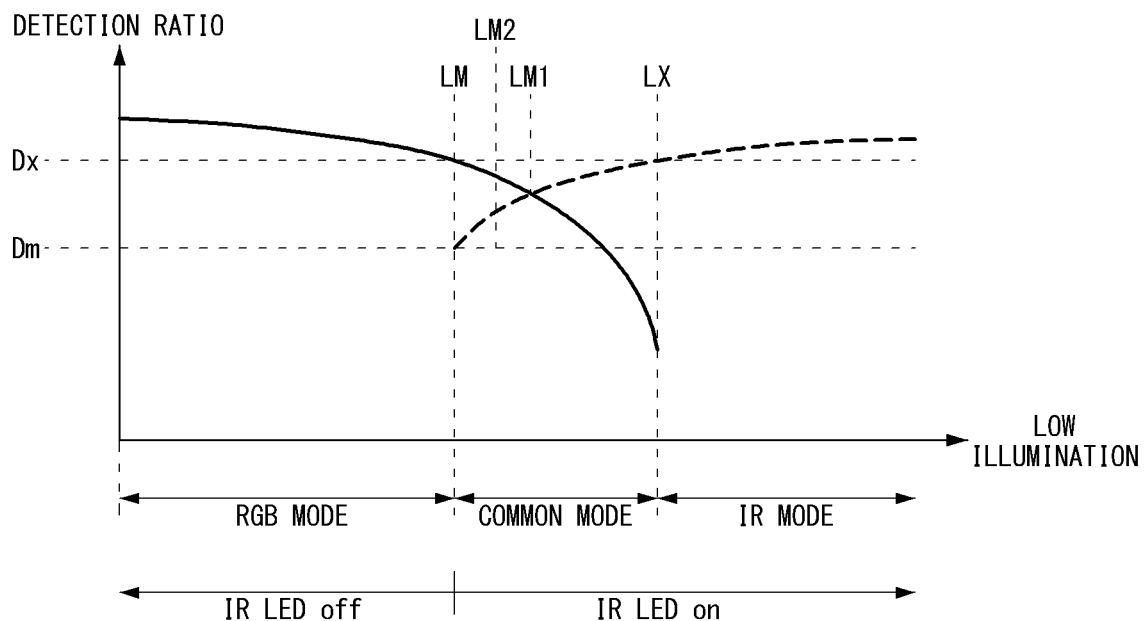

FIG. 15 is a flowchart showing a method of updating a minimum boundary value. FIGS. 16 and 17 are diagrams illustrating an embodiment of updating a minimum boundary value.

Referring to FIGS. 15 to 17, in order to update a minimum boundary value, in first step (S1501), the monitoring control unit 340 calculates the detection ratio of RGB images for the first minimum boundary value. The first minimum boundary value LM may be one set for a predetermined first period in ninth step (S1409) shown in FIG. 14.

The RGB image read-out ratio of the first minimum boundary value LM shows the detection ratio of landmarks for a first period when an RGB image is created in fifth step (S1105) shown in FIG. 11 with the RGB image read-out ratio set on the basis of the first minimum boundary value LM.

In second step (S1303), the monitoring control unit 340 reads out the detection ratio the RGB images for a second minimum boundary value. The second minimum boundary value LM may be one set for a predetermined second period in ninth step (S1409) shown in FIG. 14. That is, the first minimum boundary value LM and the second minimum boundary value LM correspond to minimum boundary values LM set using the same method for different periods.

The RGB image read-out ratio of the second minimum boundary value LM shows the detection ratio of landmarks for a second period when an RGB image is created in fifth step (S1105) shown in FIG. 11 with the RGB image read-out ratio set on the basis of the second minimum boundary value LM.

In third step (S1503), the monitoring control unit 340 compares the magnitude of the detection ratios of RGB images for the first minimum boundary value LM and the second minimum boundary value LM.

In fourth step (S1504), the monitoring control unit 340 updates the one with a larger detection ratio as a minimum boundary value. This is because, the higher the detection ratio of RGB images, the closer the minimum boundary value in the common period comes to the ideal minimum boundary value Lm.

Figure 18:
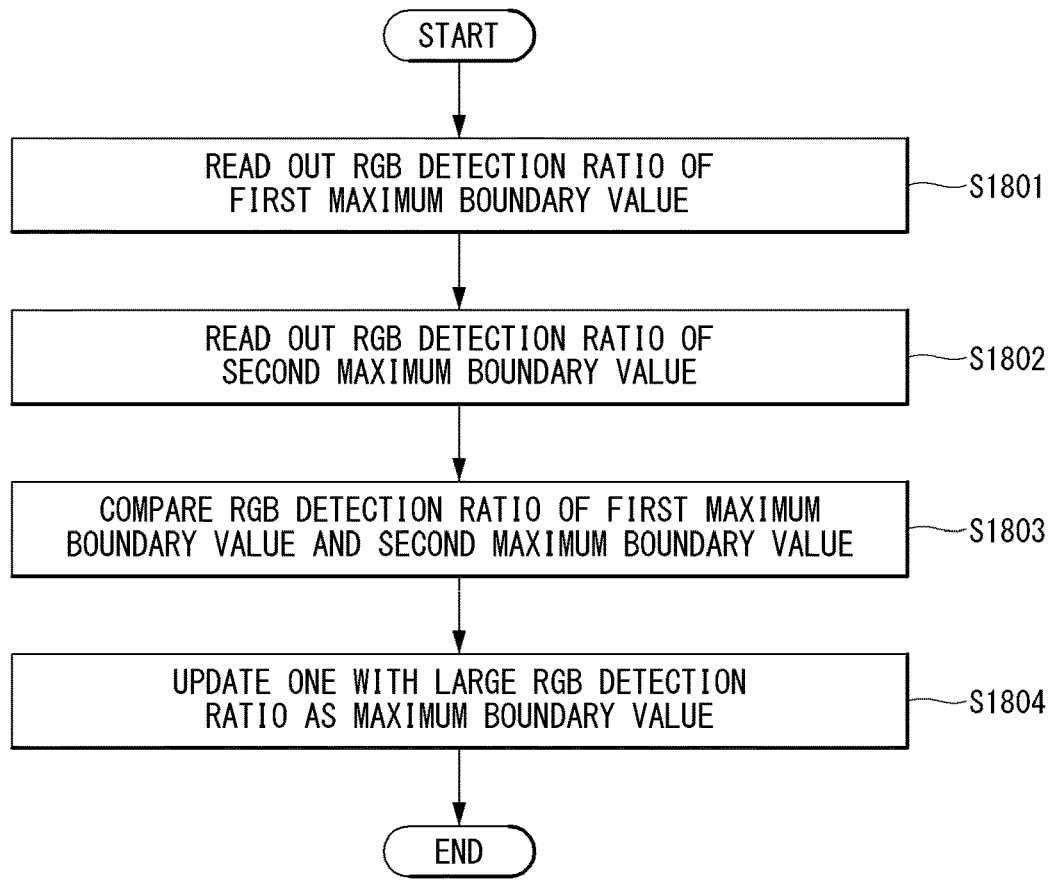
FIG. 18 is a flowchart showing a method of updating a maximum boundary value.
Figure 19:
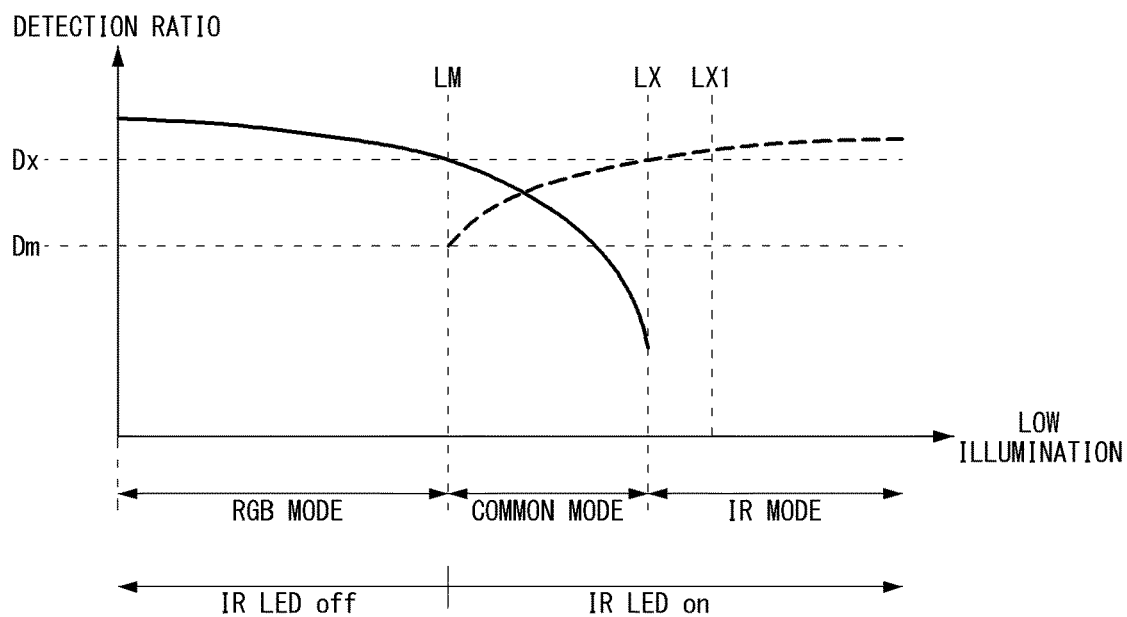
FIGS. 19 and 20 are diagrams illustrating an embodiment of updating a maximum boundary value.
Figure 20:
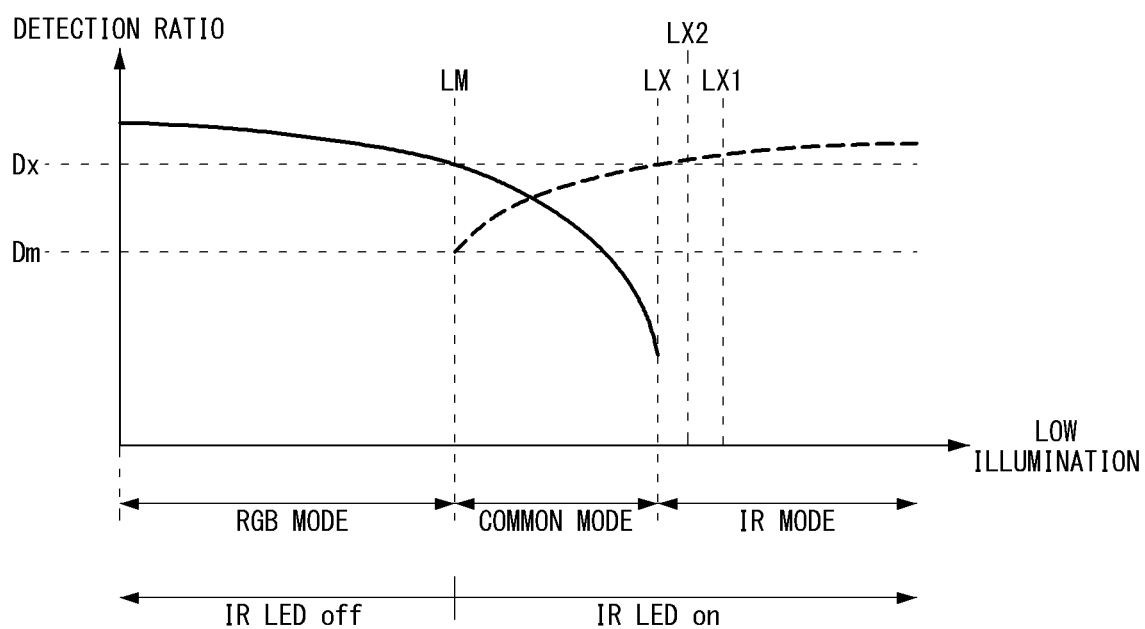

FIG. 18 is a flowchart showing a method of updating a maximum boundary value. FIGS. 19 and 20 are diagrams illustrating an embodiment of updating a maximum boundary value.

Referring to FIGS. 18 to 20, in order to update a maximum boundary value, in first step (S1801), the monitoring control unit 340 calculates the detection ratio of IR images for the first maximum boundary value. The first maximum boundary value LX may be one set for a predetermined first period in ninth step (S1407) shown in FIG. 14.

The IR image read-out ratio of the first maximum boundary value LX shows the detection ratio of landmarks for a first period when an IR image is created in sixth step (S1106) shown in FIG. 11 with the IR image read-out ratio set on the basis of the first maximum boundary value LX.

In second step (S1802), the monitoring control unit 340 reads out the detection ratio the IR images for a second maximum boundary value. The second maximum boundary value LX may be one set for a predetermined second period in ninth step (S1409) shown in FIG. 14. That is, the first maximum boundary value LX and the second maximum boundary value LX correspond to maximum boundary values LX set using the same method for different periods.

The IR image read-out ratio of the second maximum boundary value LX shows the detection ratio of landmarks for a second period when an IR image is created in sixth step (S1106) shown in FIG. 11 with the IR image read-out ratio set on the basis of the second maximum boundary value LX.

In third step (S1803), the monitoring control unit 340 compares the magnitude of the detection ratios of IR images for the first correspond maximum boundary value LM and the second correspond maximum boundary value LM.

In fourth step (S1804), the monitoring control unit 340 updates the one with a smaller detection ratio as a maximum boundary value. This is because the lower the detection ratio of IR images, the closer the maximum boundary value in the IR period comes to the ideal maximum boundary value Lx.

Figure 21:
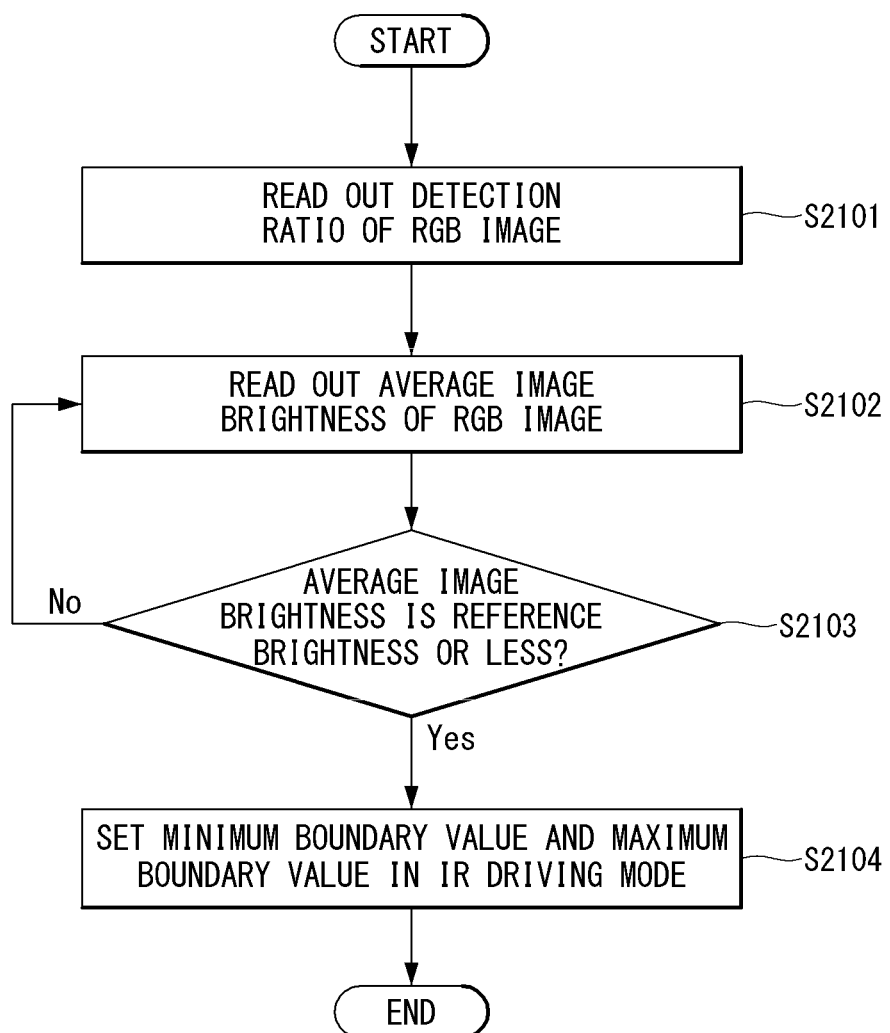
FIG. 21 is a diagram illustrating a method of using meta information in a process of setting a minimum boundary value and a maximum boundary value.

FIG. 21 is a diagram illustrating a method of using meta information in a process of setting a minimum boundary value and a maximum boundary value. FIG. 21 corresponds to an additional embodiment of the method of setting a minimum boundary value and a maximum boundary value show in FIG. 14.

Referring to FIG. 21, in first step (S2101), the monitoring control unit 340 reads out the detection ratio the RGB images. First step (S2101) corresponds to third step (S1303) shown in FIG. 14.

In second step (S2102), the monitoring control unit 340 reads out the average image brightness of RGB images. The average image brightness refers to an average gradation of RGB images.

In third step (S2103), the monitoring control unit 340 compares the average image brightness with predetermined reference brightness. The average image brightness is proportioned to not only the luminosity, but also the illumination of a target. Accordingly, when the average image brightness is low, it means that there is high possibility that the surrounding illumination is low.

In fourth step (S2104), when the average image brightness is reference brightness or less, the monitoring control unit 340 sets a minimum boundary value and a maximum boundary value while driving in the IR driving mode.

When the detection ratio of IR images is the second reference value Dm or more and less than the first reference value Dx, the monitoring control unit 340 can sense illumination and set the illumination as a minimum boundary value.

Further, when the detection ratio of IR images is the second reference value Dm or more, the monitoring control unit 340 can sense illumination and set the illumination as a maximum boundary value.

As shown in FIG. 21, according to an embodiment of the present invention, it is possible to set a more accurate boundary value by updating a boundary value using meta information such as average image brightness of an image.

Figure 22:
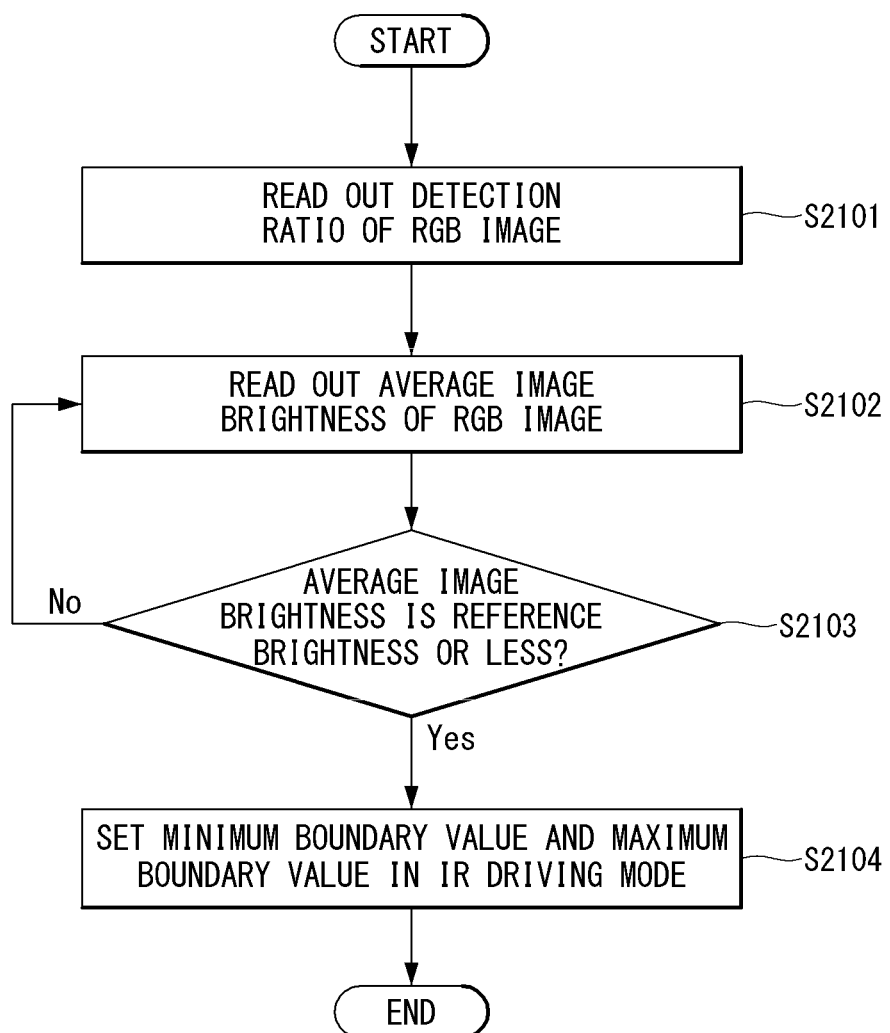
FIG. 22 is a flowchart illustrating a method of creating an error event of an image sensor.

FIG. 22 is a flowchart illustrating a method of creating an error event of an image sensor.

Referring to FIG. 22, in an embodiment that creates an error event, in first step (S2201), the monitoring system 300 is driven in the IR mode.

In second step (S2202), the monitoring control unit 340 reads out a detection ratio of low illumination. Low illumination means an illumination value lower than the maximum boundary value LX. That is, low illumination corresponds to an illumination value at which a very high read-out ratio of IR images can be expected.

In third step (S1303), the monitoring control unit 340 compares the detection ratio of IR images with a reference detection ratio. The reference detection ratio is set lower than the first reference value Dx.

In fourth step (S2204), when the detection ratio of IR images at lower illumination is the reference detection ratio or less, the monitoring control unit 340 creates an error event. Since low illumination is an illumination value lower than the maximum boundary value LX, the detection ratio of IR images at low illumination should be higher than the first reference value Dx. Accordingly, when the detection ratio of IR images at low illumination is a reference value, which is set lower than the first reference value Dx, or less, it is considered as an error.

The components described herein should not be construed as being limited and should be construed as being examples in all terms. The scope of the present invention should be determined by reasonable analysis of the claims and all changes within an equivalent range of the present invention is included in the scope of the present invention.

What is claimed is:

1. A method of monitoring an interior of an autonomous vehicle using an image sensor including a unit pixel composed of an infrared pixel and three primary color-pixels, the method comprising:
setting an RGB mode boundary value that is expressed in illumination and an infrared mode boundary value having illumination lower than the RGB mode boundary value;
acquiring an illumination value of the interior of the vehicle; and
creating an RGB image and an infrared image from the image sensor in accordance with the illumination value and driving in a common mode that creates both of the RGB image and the infrared image when the illumination value is less than the RGB mode boundary value and is the infrared mode boundary value or more,
wherein setting the RGB mode boundary value includes:
calculating a detection ratio that is a ratio of images from which landmarks disposed at a specific position in the vehicle are detected of several RGB images, acquiring an illumination value of the interior of the vehicle when the detection ratio is less than a predetermined first reference value and is a predetermined second reference value or more in a range lower than the first reference value, and setting the illumination value as the RGB mode boundary value.

2. The method of claim 1, further comprising driving in an RGB mode that creates an RGB image from the image sensor when the illumination value is the RGB mode boundary value or more.

3. The method of claim 1, further comprising driving in an infrared mode that creates an IR image from the image sensor when the illumination value is less than the infrared mode boundary value.

4. The method of claim 1, wherein setting the infrared mode boundary value includes setting the RGB mode boundary value such that a detection ratio becomes a predetermined first reference value or more when the detection ratio, which is a ratio of images from which landmarks disposed at a specific position in the vehicle are detected of several IR images, is acquired at illumination that is lower than the infrared mode boundary value.

5. The method of claim 1, further comprising:
acquiring an illumination value of the interior of the vehicle when the detection ratio is less than the second reference value; and
setting the illumination value as the infrared mode boundary value.

6. The method of claim 1, wherein setting the RGB mode boundary value further includes:
acquiring a first RGB mode boundary value in a first period;
acquiring the detection ratio of the RGB images based on the first RGB mode boundary value;
acquiring a second RGB mode boundary value in a second period not overlapping the first period;
acquiring the detection ratio of the RGB images based on the second RGB mode boundary value; and
setting one from which the detection ratio of the RGB images is acquired higher of the first RGB mode boundary value and the second RGB mode boundary value as the RGB mode boundary value.

7. A method of monitoring an interior of an autonomous vehicle using an image sensor including a unit pixel composed of an infrared pixel and three primary color-pixels, the method comprising:
setting an RGB mode boundary value that is expressed in illumination and an infrared mode boundary value having illumination lower than the RGB mode boundary value;
acquiring an illumination value of the interior of the vehicle; and
creating an RGB image and an infrared image from the image sensor in accordance with the illumination value, and driving in a common mode that creates both of the RGB image and the infrared image when the illumination value is less than the RGB mode boundary value and is the infrared mode boundary value or more,
wherein driving in the common mode includes:
calculating a detection ratio of RGB images that is a ratio of images from which landmarks disposed at a specific position of the interior of the vehicle are detected of several RGB images for a predetermined time,
acquiring a detection ratio of IR images that is a ratio of images from which landmarks disposed at a specific position of the interior of the vehicle are detected of several IR images for a predetermined time, and
performing monitoring on images having a larger value of the detection ratio of RGB images or the detection ratio of IR images.

8. The method of claim 4, wherein setting the infrared mode boundary value includes:
calculating an average gradation value of pixels in an RGB area in an RGB mode;
driving in an infrared mode when the average gradation value is predetermined reference brightness or less; and
setting the infrared mode boundary value based on the detection ratio of the IR images in driving in the infrared mode.

9. The method of claim 4, further comprising:
acquiring the detection ratio of the IR images at illumination lower than the infrared mode boundary value in driving in an infrared mode; and
creating an error event when the detection ratio of the IR images is less than the first reference value.

10. The method of claim 1, wherein the creating of an infrared image further includes radiating infrared light to the interior of the vehicle using an infrared radiation unit.

11. A system for monitoring an interior of a vehicle, the system comprising:
an image sensor that is disposed in the vehicle and includes a unit pixel the unit pixel including an infrared pixel and three primary color-pixels;
an illumination sensor configured to acquire illumination of the interior of the vehicle; and
a monitoring control module configured to create an RGB image and an infrared image from the image sensor in accordance with an illumination value corresponding to the illumination of the interior of the vehicle,
wherein the monitoring control module is configured to create both of the RGB image and the infrared image when the illumination value is less than a predetermined RGB mode boundary value and is a predetermined infrared mode boundary value, and
wherein the monitoring control module is configured to:
calculate a detection ratio that is a ratio of images from which landmarks disposed at a specific position in the vehicle are detected of several RGB images,
acquire an illumination value of the interior of the vehicle when the detection ratio is less than a predetermined first reference value and is a predetermined second reference value or more in a range lower than the first reference value, and
set the illumination value as the RGB mode boundary value.

12. A system for monitoring an interior of a vehicle, the system comprising:
an image sensor that is disposed in the vehicle and includes a unit pixel, the unit pixel including an infrared pixel and three primary color-pixels;
an illumination sensor configured to acquire illumination of the interior of the vehicle; and
a monitoring control module configured to create an RGB image and an infrared image from the image sensor in accordance with an illumination value corresponding to the illumination of the interior of the vehicle, wherein the monitoring control module is configured to create both of the RGB image and the infrared image when the illumination value is less than a predetermined RGB mode boundary value and is a predetermined infrared mode boundary value, and wherein the monitoring control module is configured to, in a common mode:
- calculate a detection ratio of RGB images that is a ratio of images from which landmarks disposed at a specific position of the interior of the vehicle are detected of several RGB images for a predetermined time,
- acquire a detection ratio of IR images that is a ratio of images from which landmarks disposed at a specific position of the interior of the vehicle are detected of several IR images for a predetermined time, and
- perform monitoring on images having a larger value of the detection ratio of RGB images or the detection ratio of IR images.

\* \* \* \* \*